No. 625,098. Patented May 16, 1899.
J. B. ENTZ.
ELECTRICAL DISTRIBUTION BY STORAGE BATTERIES.
(Application filed Feb. 1, 1899.)
(No Model.)
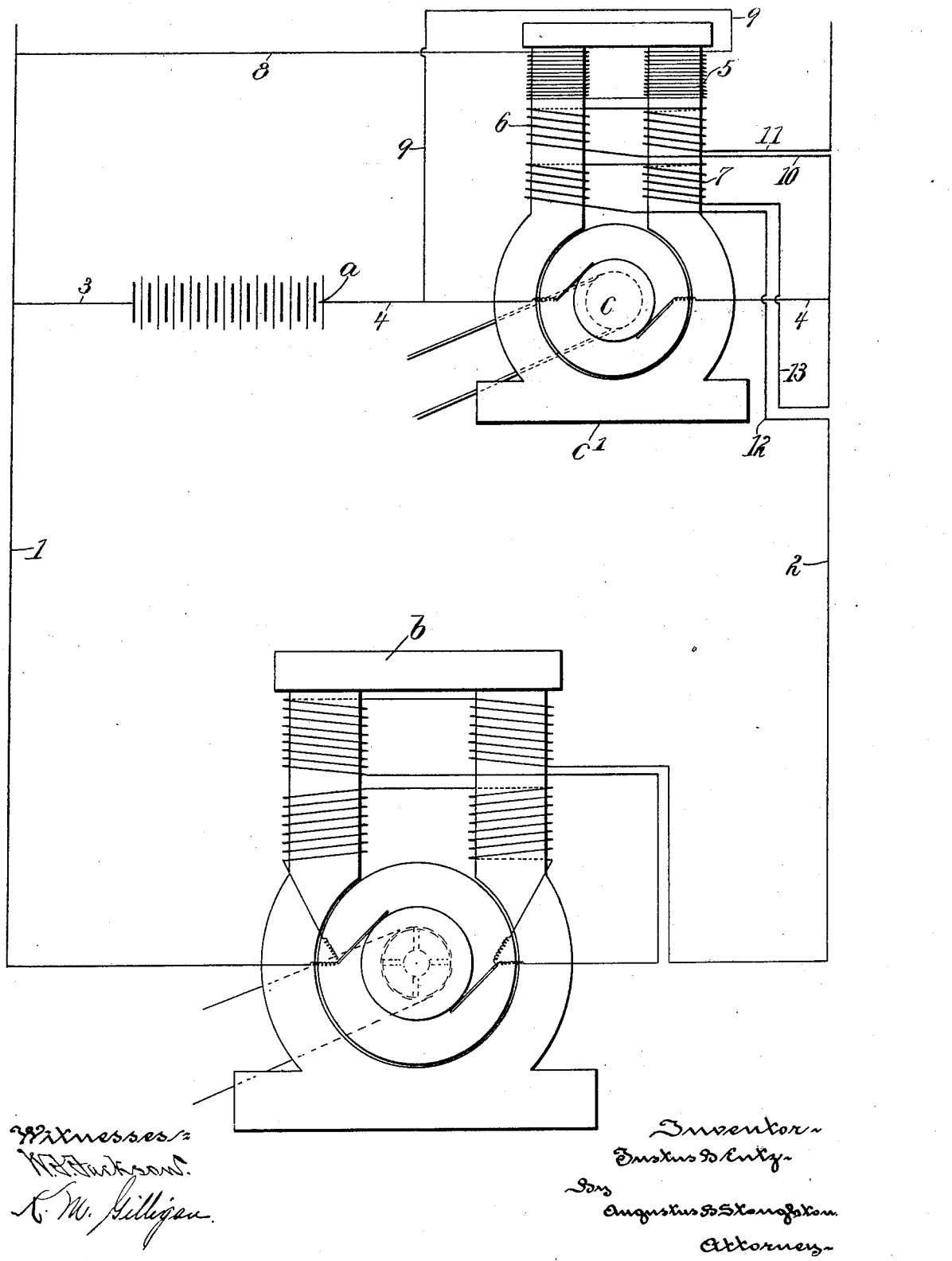

UNITED STATES PATENT OFFICE.

JUSTUS B. ENTZ, OF PHILADELPHIA, PENNSYLVANIA, ASSIGNOR TO THE ELECTRIC STORAGE BATTERY COMPANY, OF NEW JERSEY.

ELECTRICAL DISTRIBUTION BY STORAGE BATTERIES.

SPECIFICATION forming part of Letters Patent No. 625,098, dated May 16, 1899.

Application filed February 1, 1899. Serial No. 704,113. (No model.)

*To all whom it may concern:*

Be it known that I, JUSTUS B. ENTZ, a citizen of the United States, residing at the city of Philadelphia, in the county of Philadelphia, and State of Pennsylvania, have invented certain new and useful Improvements in Electrical Distribution by Storage Batteries, of which the following is a specification.

The object of my invention is to keep the load on a generator or generators substantially constant and to cause a storage battery to compensate for changes in load occurring in the working circuit.

To this end my invention comprises means hereinafter described, and particularly pointed out in the claim for effecting and controlling the excitation of the field of the booster or dynamo-electric machine that is employed in connection with the battery.

The nature, characteristic features, and scope of my invention will be more fully understood from the following description taken in connection with the accompanying drawing, forming part hereof, and in which I have illustrated, diagrammatically, apparatus embodying features of my invention.

In the drawing, $a$ is a battery in multiple with the generator $b$ by way of the working or line conductors 1 and 2 and battery-conductors 3 and 4. The armature $c$ of the dynamo-electric machine $c'$ is interposed in the battery-conductor 4, and this machine is what is known as a "booster." Upon the field of the booster $c'$ are placed coils 5, 6, and 7. The coil 5 is composed of comparatively fine wire and of many turns, and the coils 6 and 7 are composed, respectively, of comparatively few turns of coarse wire. The coil 5 is connected to the circuit so as to excite the field in one direction, and the coils 6 and 7 are connected so as to excite the field in the opposite direction, so that the effect of the coils 6 and 7 is to oppose the effect of the coil 5 in respect to magnetization of the field. The coils 6 and 7 are in series relation with respect to the conductor 2. However, one, 7, of them is led off from the conductor 2 on the generator side of the union of the battery-conductor 4 with the working conductor 2, and the other, 6, of them is led off from the conductor 2 on the service side of the union of the battery-conductor 4 with the working conductor 2. The object of this arrangement will be presently described. The circuit for the coil 5 may be as follows: from the conductor 1, by conductor 8, through the coil 5, and by conductor 9 to the conductor 4. In this case the coil is connected across the battery-terminals; but it may be connected across the service-conductors or the generator-terminals. The path through the coil 6 may be described as from the conductor 2, by 10, through coil 6, by 11, back to conductor 2. The path for coil 7 may be described as by 12, through coil 7, and by 13 to conductor 2.

Under certain conditions of load the coil 5 is balanced by the coils 6 and 7, so that the voltage of the booster may be represented as zero, and no current is taken from the battery. In the event of an increased load in the service or working circuit the coil 6 by its action upon the field of the booster causes the latter to raise the voltage of the battery by the same amount as it tends to fall by reason of an increased discharge equal in amount to the increase of load on the service-conductors. In the event of a decreased load in the service or working circuit the coil 5 overbalances the coil 6, and its action upon the booster lowers the voltage of the battery to the extent that it will take current from the generator equal to the decrease of load on the working circuit, and thus keep the load on the generator constant; but in order for the whole system to work properly and keep a constant load on the generator $b$ the voltage of the battery must always rise or fall the same amount for a given decrease or increase in charge or discharge. In practice the change in voltage of a battery for a given change in current depends upon whether the battery is more or less fully charged. Therefore under all conditions of the battery the coil 6 alone in connection with the coil 5 would not effect the regulation required for keeping the load on the generator constant and causing the battery to compensate for change in load. The coil 7 by its operation upon the field of the booster causes the latter to govern the voltage of the battery by a change of current in the generator-circuit—that is to say, in the circuit of the working conductors on the generator side of the battery-conductors 3 4—so that if due to imperfect regulation by the coil 6 an increase or decrease of load comes on the generator $b$ and must pass through the coil 7. An increase of current through the coil 7 operates to raise the voltage of the booster, and therefore tends to increase the discharge of the battery, thereby reducing the increased load that would otherwise come on the generator. A decrease of current through the coil 7 operates to decrease the voltage of the booster and battery, and therefore tends to make the battery take more current from the generator than it would otherwise do. The action of a change of current in the coil 7 is the same as in the coil 6. If the coil 6 works perfectly, the change in load on the working conductors is compensated for by the charge and discharge of the battery, and no change of current occurs through the coil 7 or in the generator. By reason of changes in the condition of the battery the compensation of coil 6 is frequently not sufficient and change of current does get back to the generator. Such current must pass through the coil 7, which thus adds its governing effect to that of coil 6 and causes the battery to charge and discharge and to keep the load on the generator constant.

In order to govern the load on the generator by means of a single coil, such as 7, it would have to be of exceedingly large size in order to keep the load on the generator constant within reasonably narrow limits, because a small change of current through it would have to produce the total regulating effect. However, to only correct imperfections of regulation of the coil 6 due to changes in the battery condition it need be of only moderate size.

It will be obvious to those skilled in the art to which the invention appertains that modifications may be made in details without departing from the spirit thereof. Hence I do not limit myself to the precise construction and arrangement of parts hereinabove set forth and illustrated in the accompanying drawings; but,

Having thus described the nature and objects of my invention, what I claim as new, and desire to secure by Letters Patent, is—

In a system of electrical distribution by storage batteries the combination with a booster interposed in a battery-conductor, of, a practically constantly-excited field-coil for the booster and two series field-coils opposed to the said coil and respectively interposed in a working conductor on the generator and service sides of its union with the battery-conductor, substantially as described.

In testimony whereof I have hereunto signed my name.

JUSTUS B. ENTZ.

In presence of—
ALFRED J. WILKINSON,
K. M. GILLIGAN.